(12) United States Patent
Braun

(10) Patent No.: US 6,451,471 B1
(45) Date of Patent: Sep. 17, 2002

(54) CONDUCTIVITY FUEL CELL COLLECTOR PLATE AND METHOD OF FABRICATION

(75) Inventor: James C. Braun, Juno Beach, FL (US)

(73) Assignee: Teledyne Energy Systems, Inc., Hunt Valley, MD (US)

( * ) Notice: Subject to any disclaimer, the term of this patent is extended or adjusted under 35 U.S.C. 154(b) by 84 days.

(21) Appl. No.: 09/611,471

(22) Filed: Jul. 7, 2000

Related U.S. Application Data

(60) Provisional application No. 60/143,967, filed on Jul. 15, 1999.

(51) Int. Cl.⁷ .................................................. H01M 4/86
(52) U.S. Cl. .............................. 429/44; 429/13; 429/27; 429/34
(58) Field of Search .............................. 429/13, 27, 34, 429/44

(56) References Cited

U.S. PATENT DOCUMENTS 6,180,275 B1 * 1/2001 Braun et al. .................. 429/34

* cited by examiner

Primary Examiner—Carol Chaney
Assistant Examiner—Dah Wei Yuan
(74) Attorney, Agent, or Firm—Akerman Senterfitt

(57) ABSTRACT

An improved method of manufacturing a PEM fuel cell collector plate is disclosed. During molding a highly conductive polymer composite is formed having a relatively high polymer concentration along its external surfaces. After molding the polymer rich layer is removed from the land areas by machining, grinding or similar process. This layer removal results in increased overall conductivity of the molded collector plate. The polymer rich surface remains in the collector plate channels, providing increased mechanical strength and other benefits to the channels. The improved method also permits greater mold cavity thickness providing a number of advantages during the molding process.

19 Claims, 7 Drawing Sheets

CONDUCTIVITY FUEL CELL COLLECTOR PLATE AND METHOD OF FABRICATION

CROSS-REFERENCE TO A RELATED APPLICATION

This application claims the benefit of U.S. Provisional Application, Ser. No. 60/143,967, filed Jul. 15, 1999.

STATEMENT REGARDING FEDERALLY SPONSORED RESEARCH OR DEVELOPMENT

The United States Government has rights in this invention pursuant to Contract No. DE-FC02-97EE50476 between the United States Department of Energy and Energy Partners, L.C.

FIELD OF THE INVENTION

The invention relates to conductive polymer composite structures and methods for their manufacture. More particularly, the invention relates to injection or compression molded conductive polymer compositions and techniques for their manufacture.

BACKGROUND OF THE INVENTION

Polymers can have fundamentally different structures, and one distinguishes between thermoset and thermoplastic polymers. Thermoset polymers are cured over time using heat and chemicals to form chemical bonds. This process is not reversible, and the resulting structure is permanent, unless hydrolysis, chemical attack or oxidation at high temperatures degrades the structural bonds. Thermoplastics, on the other hand, can be formed with a simple melting and cooling process. Upon cooling, the polymer solidifies into the desired shape. Of particular importance, parts containing thermoplastic polymer have the advantage of being recyclable, and can be manufactured with overall cycle times generally below 30 seconds. Highly conductive polymer composite structures with complex geometry are being developed and manufactured for use as corrosion resistant structures in electronic, electrochemical, thermal and thermoelectric device applications, such as collector plates in PEM fuel cells.

Injection molding is a well known method for mass-producing plastic components. Using this method, complex parts can be inexpensively produced with excellent detail and tolerance control. In addition, parts molded from certain plastics have very good resistance to chemical attack and corrosion, albeit at moderate temperatures. The injection molding method of manufacturing has been limited to materials with relatively poor electrical and thermal conductivity. This limitation results from the need for polymer-rich compositions to ensure adequate flow during the molding process; and polymers are poor conductors of heat and electricity. Consequently, the development of low cost and corrosion resistant structures for electronic, electrochemical, thermal and thermoelectric device applications requires innovation in the field of highly conductive polymer composites. A highly conductive polymer composition and a process for molding the composition that incorporates high flow and high electrical and thermal conductivity has been developed by the author et. al., and is described in detail in U.S. patent application Ser. No. 195,307, filed Nov. 18, 1998. This composition, although highly filled, is injection moldable and designed for use in PEM fuel cells; functioning as an electrical conductor, heat transfer material and gas impermeable barrier with resistance to creep, hydrolysis and chemical attack at elevated temperatures. The composition is used to mold collector plates, which can comprise up to 90% by weight of each fuel cell. The constituents of a typical PEM fuel cell are depicted in FIG. 1. Injection molded composite bipolar plates (particularly those containing thermoplastics) develop electrically resistive, polymer rich surface layers during molding, and these layers can affect the performance of fuel cells during operation. If, as in a fuel cell, an electric current is conducted across an interface containing such surface layers, a significant portion of the electric current will be transformed into heat, decreasing the electrical efficiency of the fuel cell. Polymer composites molded according to this inventive molding process are highly conductive compared to prior molded polymer composites. However, this conductivity is restricted due to the higher concentrations of polymer resin at the exterior surfaces of the molded composite structure.

SUMMARY OF THE INVENTION

Accordingly, it is an objective of the invention to provide a highly conductive polymer composite structure utilizing injection or compression molding.

It is another object of the invention to further enhance the conductivity of such a molded polymer composite structure.

It is still another object of the invention to utilize a molded highly conductive polymer composite as a collector plate in a fuel cell.

It is yet another object of the invention to provide a molded highly conductive polymer composite collector plate having polymer enhanced channel surfaces, resulting in greater mechanical strength, decreased permeability and porosity, greater resistance to erosion and corrosion, and reduced resistance to flow in the channels.

It is a further object of the invention to provide a method of manufacturing a molded highly conductive polymer composite that utilizes a larger mold cavity, resulting in reduced mold pressure requirements.

It is a further object of the invention to provide a method of manufacturing a molded highly conductive polymer composite having reduced thickness.

It is a still further object of the invention to enhance the conductivity of a molded polymer composite structure utilizing relatively low cost manufacturing processes.

These and other objects of the invention are achieved by a method of fabricating a current collector plate for use in a fuel cell. The method preferably includes the steps of: providing a preferably graphite filled polymer composition shaped as a current collector plate having land areas on opposing surfaces, and removing a layer of said composition from at least one of said land areas. The composition after molding has a gradient of increasing concentration of binder, such as a polymer binder toward said land areas. After the layer removal, new land areas having reduced concentrations of polymer are provided. The highly filled polymer can be molded utilizing injection molding, compression molding or a combination of both. The composition can include a variety of polymers, but is preferably a thermoplastic. The thermoplastic is preferably a liquid crystal polymer. The layer removal is preferably performed using relatively low cost manufacturing processes such as machining, sanding or surface grinding.

The thickness of the layer to be removed can be determined by consideration of a number of factors. It is desirable that the thickness is sufficiently large to remove areas of high polymer concentration. It may be further desirable to remove an even greater thickness to improve the molding process. The removed layer should be between 0.001 and 0.5 cm thick, and is preferably in the range of 0.015 and 0.06 cm thick.

The invention is also directed to an improved fuel cell collector plate resulting from the above described manufacturing process. The improved fuel cell collector plate preferably includes a graphite-filled polymer composition having opposing planar surfaces spaced by a plate thickness. Initially, after molding, the composition has a gradient of increasing concentration of polymer toward said planar surfaces. The planar surfaces have channels and land areas outside the channels. After the layer removal on the land areas, the collector plate provides higher concentrations of conductive graphite filler in the land areas, while maintaining polymer rich surfaces within the channels. These polymer enhanced channel surfaces provide a number of benefits within the channels, such as improved mechanical strength and reduced permeability and porosity.

According to another aspect of the invention, the thickness of the removed surface layer can be predetermined by a test to identify the thickness at which the rate of conductivity change converts from a rapid change to a moderate one.

Another advantage provided by the layer removal process of the invention is that the composite structure can be molded to an initial thickness that is larger than the thickness of the final product, such as a collector plate. In injection molding, the required injection pressure is generally proportional to the ratio of the flow length to cross sectional area of the mold cavity. Thus, with an increased mold cavity thickness, a number of benefits can be achieved. The required injection pressure can be decreased because of the increased cross sectional area. Alternatively, a larger flow length and thus a larger part, can be molded at a given injection pressure. When combined with the layer removal process of the invention, a final collector plate product having an increased aspect ratio can be obtained.

The method of the invention results in conductive polymer compositions particularly for use as fuel cell collector plates having improved functionality. The improved functionality includes very high electrical and thermal conductivity, high strength and low hydrogen permeability in thin sections, and excellent resistance to erosion-corrosion at elevated temperature.

BRIEF DESCRIPTION OF THE DRAWINGS

The preferred embodiments of the invention will now be described in the following detailed description with reference to the accompanying drawings, in which.

DETAILED DESCRIPTION OF THE PREFERRED EMBODIMENTS

The present invention is directed to the relatively low cost production of high conductivity polymer composite structures utilizing injection and other types of molding. The methods of the invention have particular application to the manufacture of collector plates for use in PEM fuel cells, and the following discussion will therefore be directed to the collector plate application. It is to be understood however, that the manufacturing processes disclosed may have applicability to other environments and should not be considered limited to the manufacture of collector plates.

Figure 1:
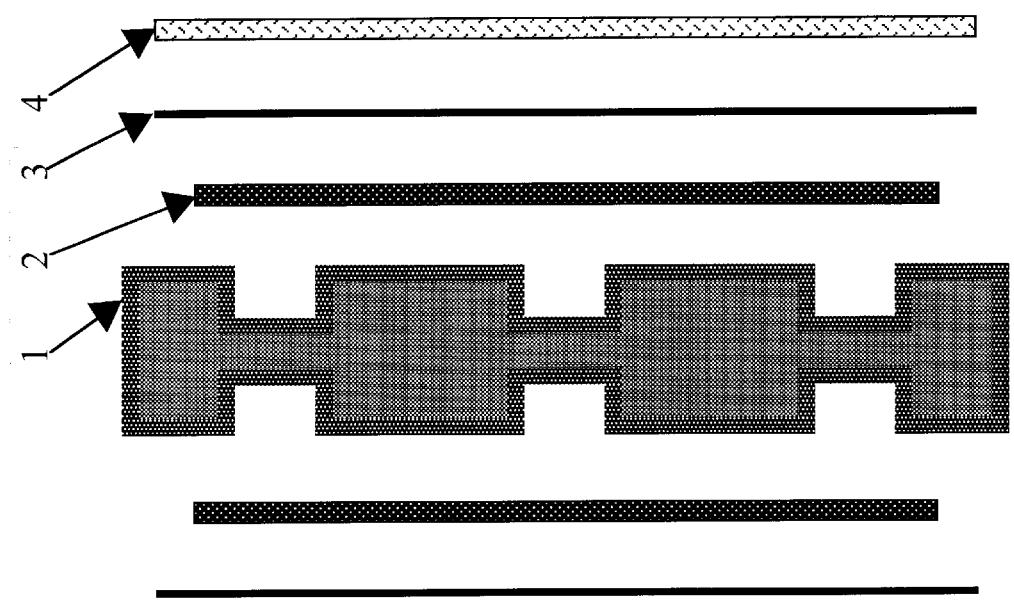
FIG. 1 is a cross-sectional view illustrating the conductive constituents of a typical PEM fuel cell.

Referring generally to the drawings, FIG. 1 is a cross-sectional view illustrating the conductive constituents of a typical PEM fuel cell. The constituents of the fuel cell include a collector plate 1, the collector plate is surrounded by gas diffusion layers 2. Each gas diffusion layers interfaces with an electrode 3. The electrodes 3 sandwich a proton exchange membrane 4. The fuel cells can be assembled in series to increase the voltage of the stack as formed. According to the invention, a low cost post-treatment is used to decrease the electrical resistance of the molded collector plates 1, without changing critical properties such as high mechanical strength, high thermal and chemical stability, low gas permeability and adequate hydrophobicity within the molded channels.

Figure 2:
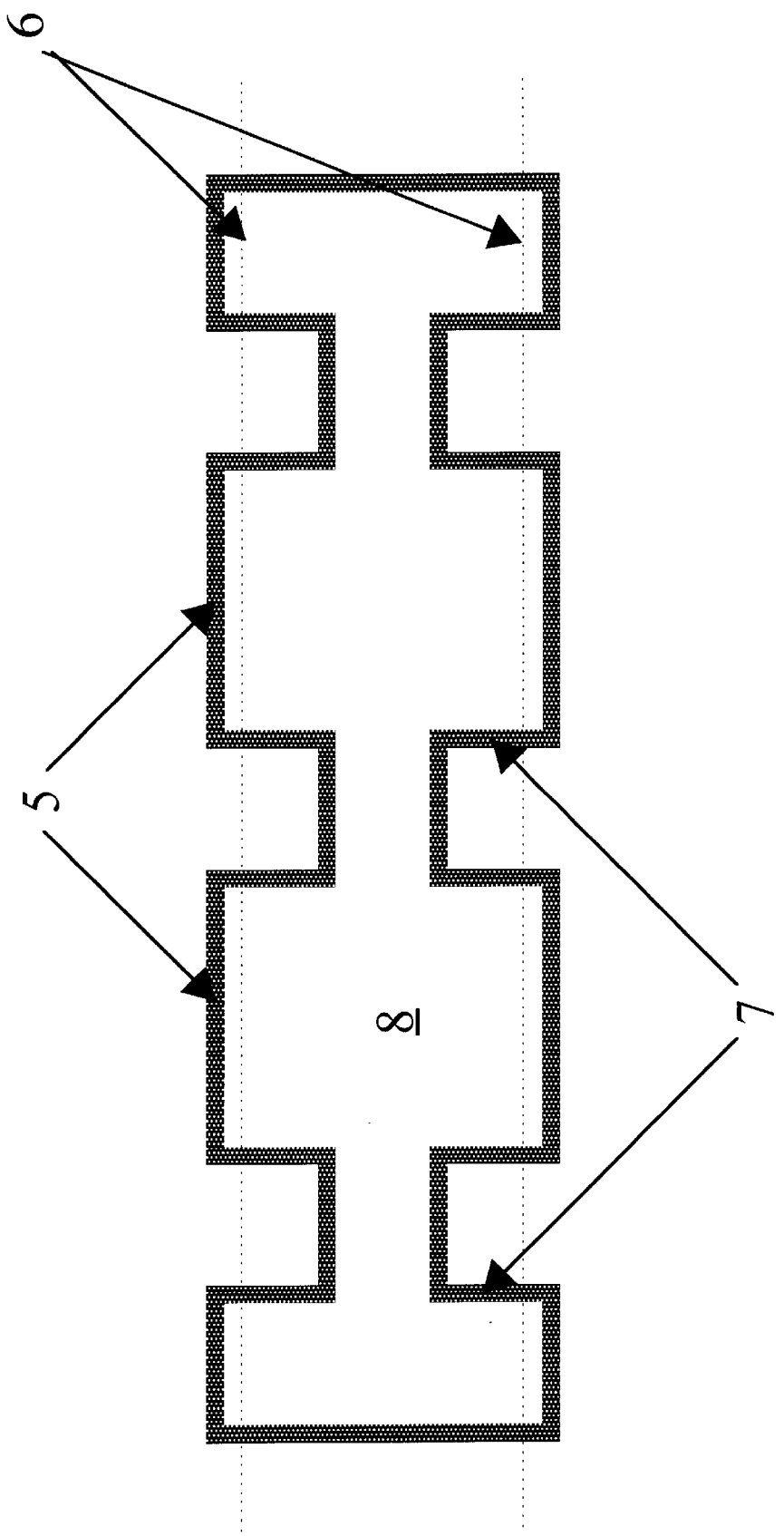
FIG. 2 is a cross-sectional view of an injection molded collector plate showing the molded surface layer and the portion of the land surfaces to be removed in accordance with the present invention.

Referring to FIG. 2, a cross-sectional view of an injection molded collector plate shows the molded surface layer and the portion of the land surfaces to be removed in accordance with the present invention. After molding, a polymer-rich surface layer 5 covers the land surfaces of the collector plate. After removal of the surface material, the land areas are reduced to a height 6. Significantly, the channel walls 7 of the collector plate retain their polymer rich surface layers, while the newly formed land areas generally provide filler rich concentration similar to that of the bulk 8 of the collector plate.

Simply stated, 0.001–0.5 cm, and ideally 0.015–0.06 cm, of the molded surface from the land areas of the plate is removed using machining, surface grinding, sanding or similar operation, in a manner that ensures a high level of flatness and parallelism in the finished plate. After the grinding operation, the land areas have the optimum height required for fuel cell operation. This height is typically between 0.05 and 0.15 cm, but may be less than 0.05 cm in certain designs.

By removing the resin-rich layer from the projections on the plate, the resulting land surfaces contain a higher filler content than the surfaces of the original injection molded article, leading to higher electrical and thermal conductivity. The channel surfaces contain the polymer rich layer developed during the injection molding process, providing high mechanical strength, excellent barrier properties, erosion and chemical resistance, as well as hydrophobicity.

The grinding operation enables one to produce an anisotropic fuel cell collector plate with a lower concentration of polymer (higher concentration of conductive filler) at the land surfaces and in the bulk of the plate, and a higher concentration of polymer (lower concentration of conductive filler) at channel surfaces within the plate. The benefit of this process is that the anisotropic structure is a permanent feature of the collector plate. In contrast, coating of the channels or the land areas would lead to excessive degradation with time and temperature.

Using the surface removal method, the land areas have a high filler content that is similar to that of the composition in the bulk of the material, providing excellent electrical and thermal conductivity. Since the land areas are in electrical contact with fuel cell components such as diffusion layers and electrodes, this treatment is sufficient to dramatically reduce the in-cell electrical resistance. This process results in fuel cell plates with up to 50% lower resistance than could be obtained in a single-step molding process.

Two methods are used to measure the resistance of the collector plate material. The first method measures the through plane resistance of a sub-cell collector plate assembly. The assembly consists of a featureless (flat) injection molded plate, sandwiched between two contact materials, and represents the configuration of a bipolar collector plate within the fuel cell. This method measures the total resistance (including contact and bulk resistances) of the materials. The contact resistance is affected by the surface properties of the materials, while the bulk resistance is affected by the internal structure.

Figure 3:
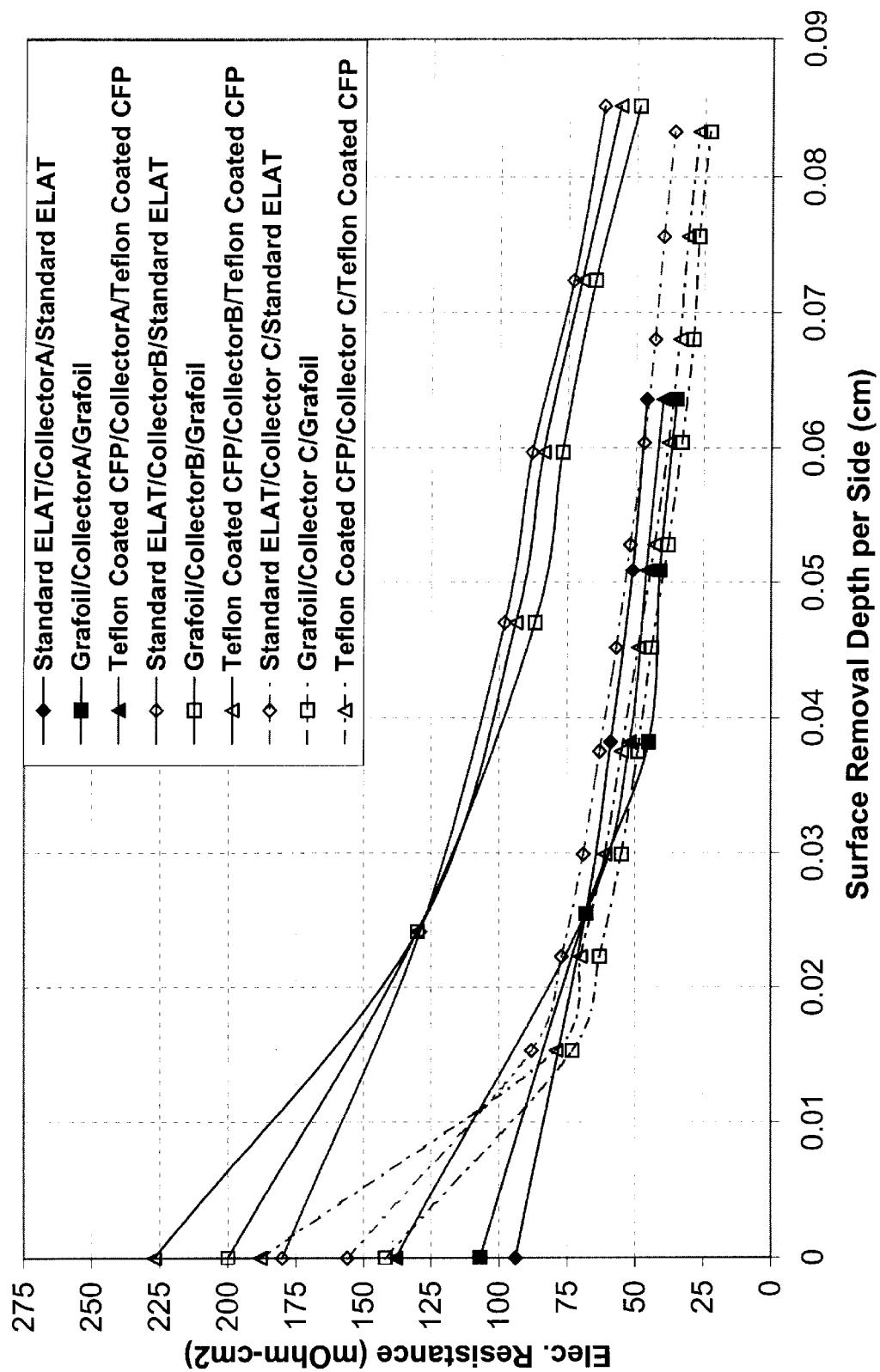
FIG. 3 is a plot of the sub-cell electrical resistance vs. land surface removal depth per side for an injection molded collector plate in accordance with the present invention.

The effect of surface removal on total electrical resistance of sub-cell collector plate assemblies is shown in FIG. 3. FIG. 3 is a plot of the sub-cell electrical resistance vs. land surface removal depth per side for an injection molded collector plate in accordance with the present invention. The sub-cell electrical unit consists of the collector plate material sandwiched between two gas diffusion layers. During testing of the electrical resistance, the surface of the plate is removed in incremental layers. Initially, the resistance decreases rapidly with the removal of surface material, but after a certain depth the resistance values decrease only moderately. The slope of the surface removal vs. electrical resistance curve dramatically changes after removing between 0.025 to 0.030 cm from the molded plate surface. FIG. 3 (and the other plots of FIGS. 4–7) show the plotting of test data for three test plates, one depicted with solid test points and solid lines, one with hollow test points and solid lines, and one with broken lines. Each test plate was tested using three different gas diffusion layer materials—ELAT, Grafoil and Carbon Fiber Paper (CFP).

Figure 4:
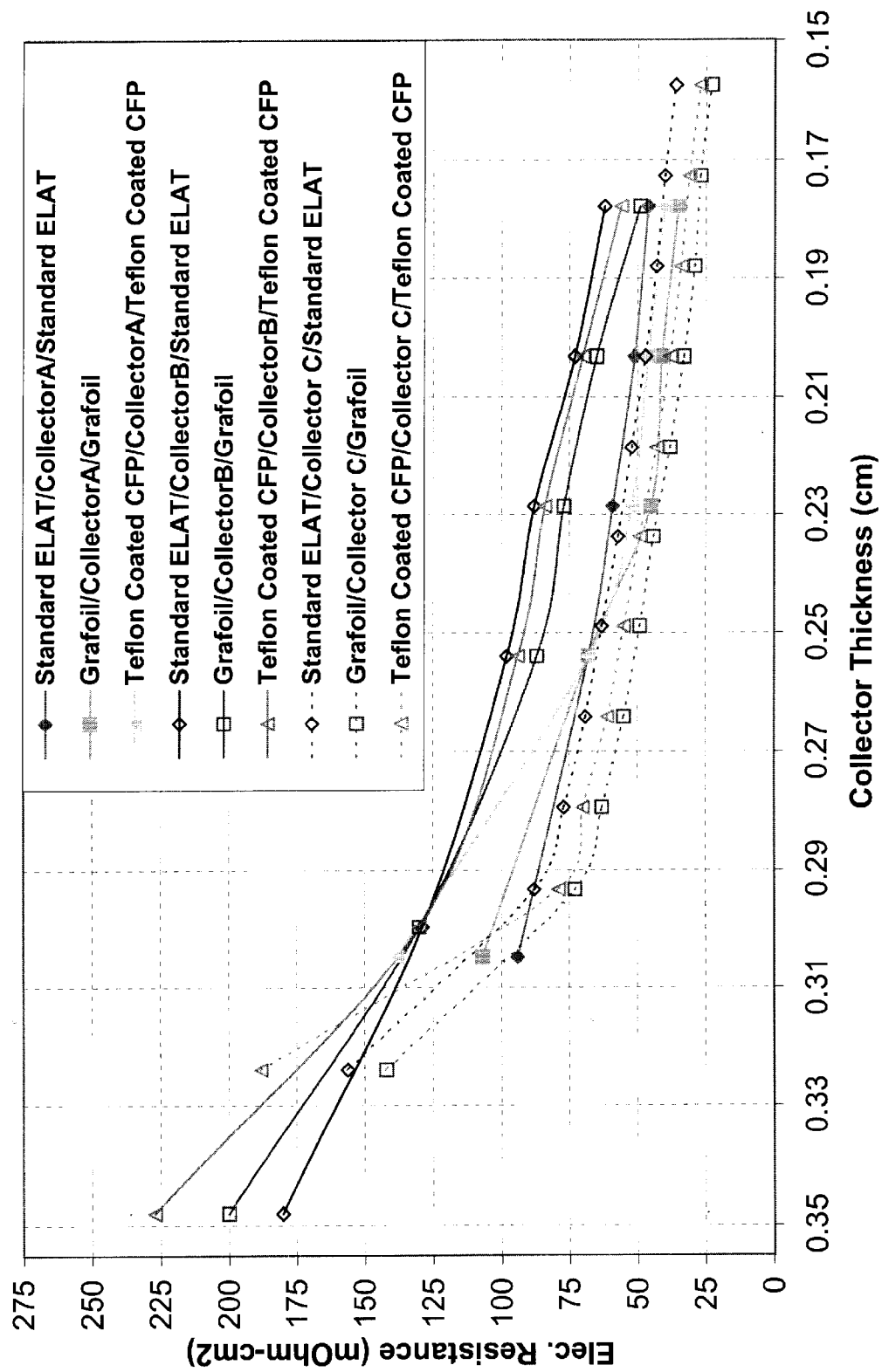
FIG. 4 is a plot of initial and machined thickness of injection molded collector plates vs. sub-cell electrical resistance.
Figure 5:
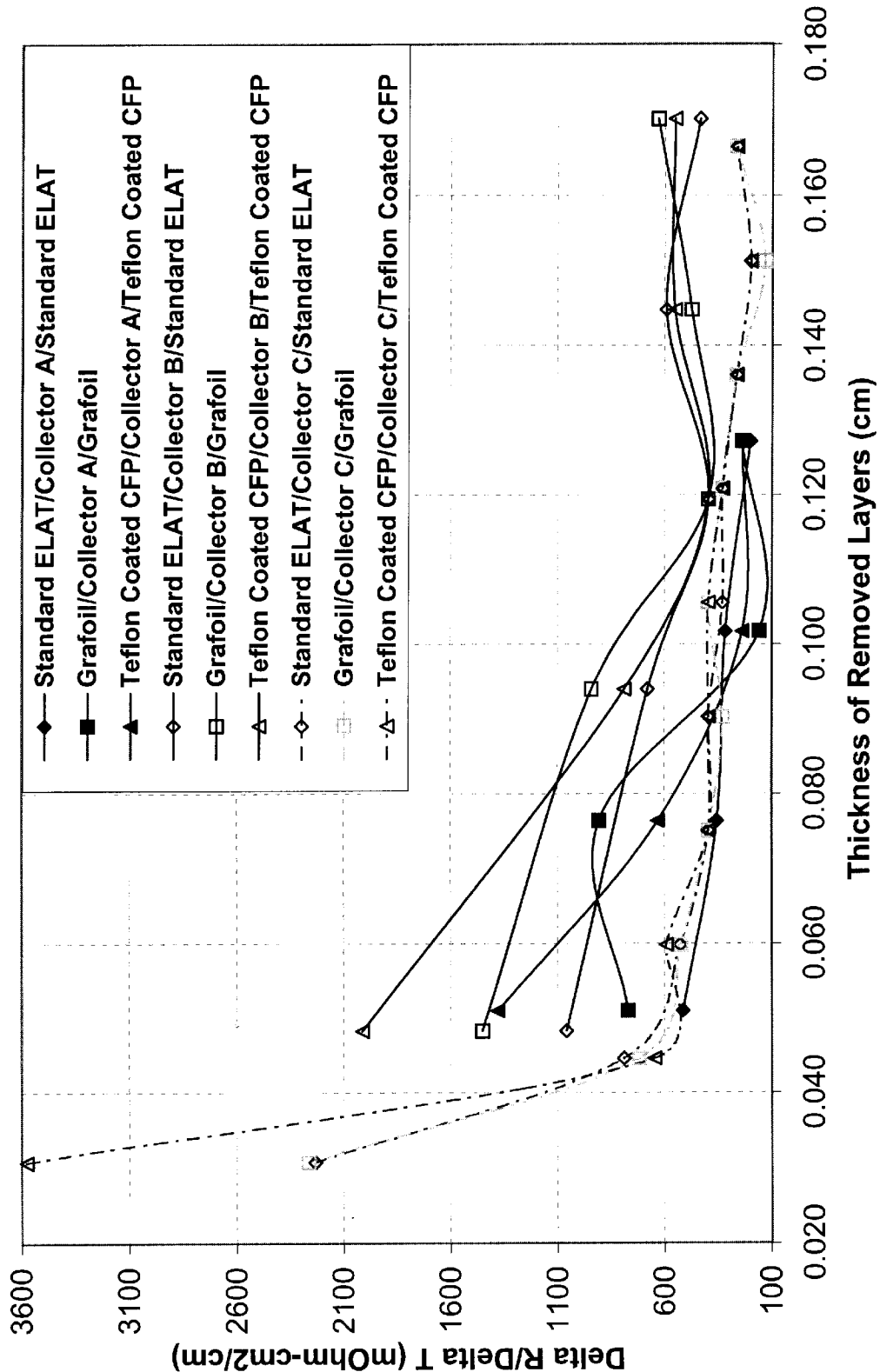
FIG. 5 is a plot of thickness of removed layers, including both faces, vs. change in subcell electrical resistance with change in plate thickness.
Figure 6:
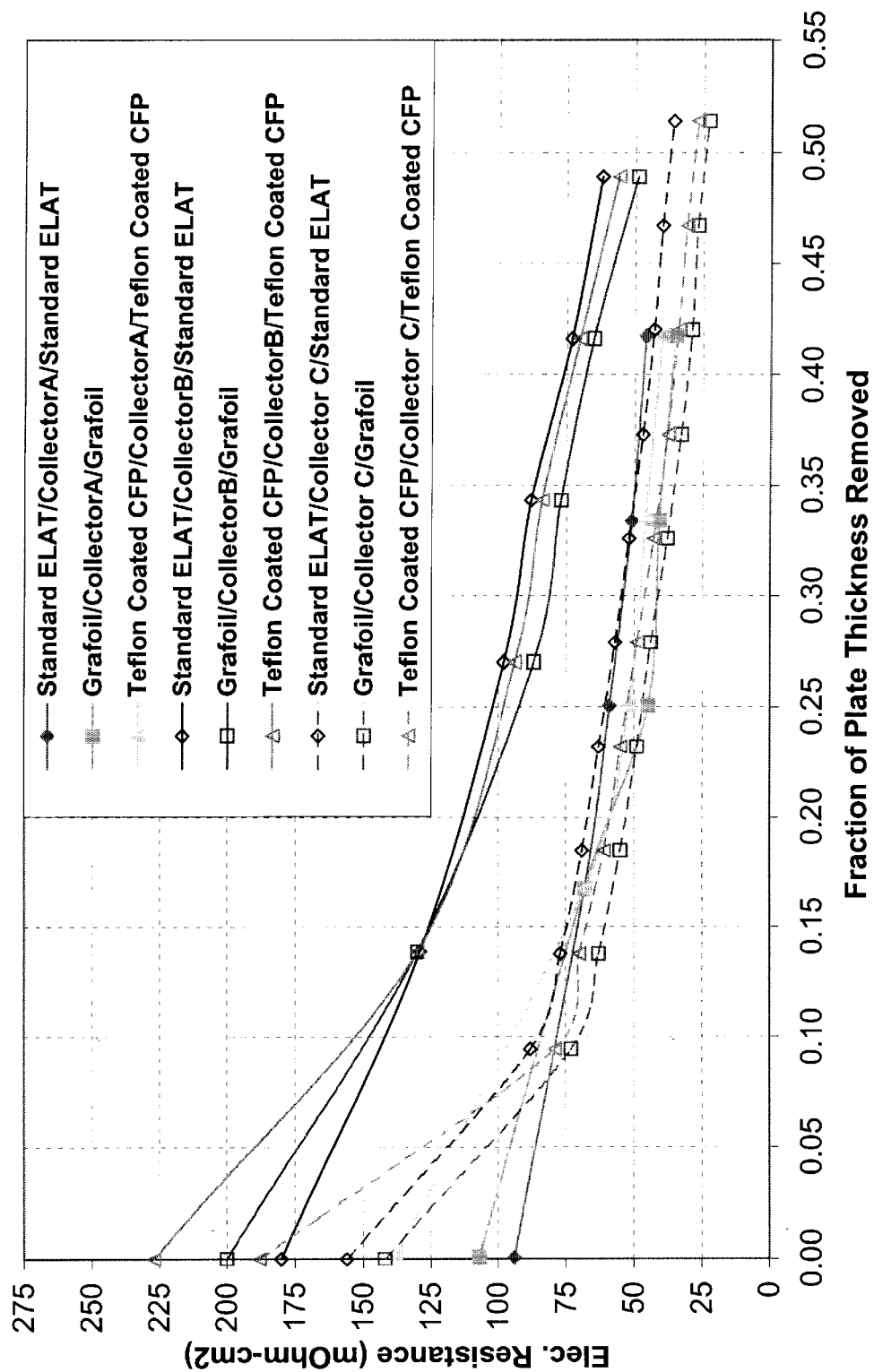
FIG. 6 is a plot of fraction of plate thickness removed by surfacing vs. sub-cell electrical resistance.

The resistive surface layer thickness can be found by machining incremental layers from the surfaces of the plate and measuring the total sub-cell resistance as in FIG. 4. Within a narrow range of surface removal depth, the slope changes dramatically. The depth at which the slope changes dramatically is independent of actual plate thickness and represents the depth of the resistive surface layer. FIG. 5 shows the change in slope as a function of the total thickness of the two removed layers one from each side of the test plate. After removal of the resistive surface layer, the through plane resistance decreases moderately with increasing material removal. This is attributed to the decreasing plate thickness and represents a more homogeneous material. FIG. 6 shows the change in sub-cell electrical resistance as layers are removed, measured as a fraction or percentage of the original plate thickness.

Figure 7:
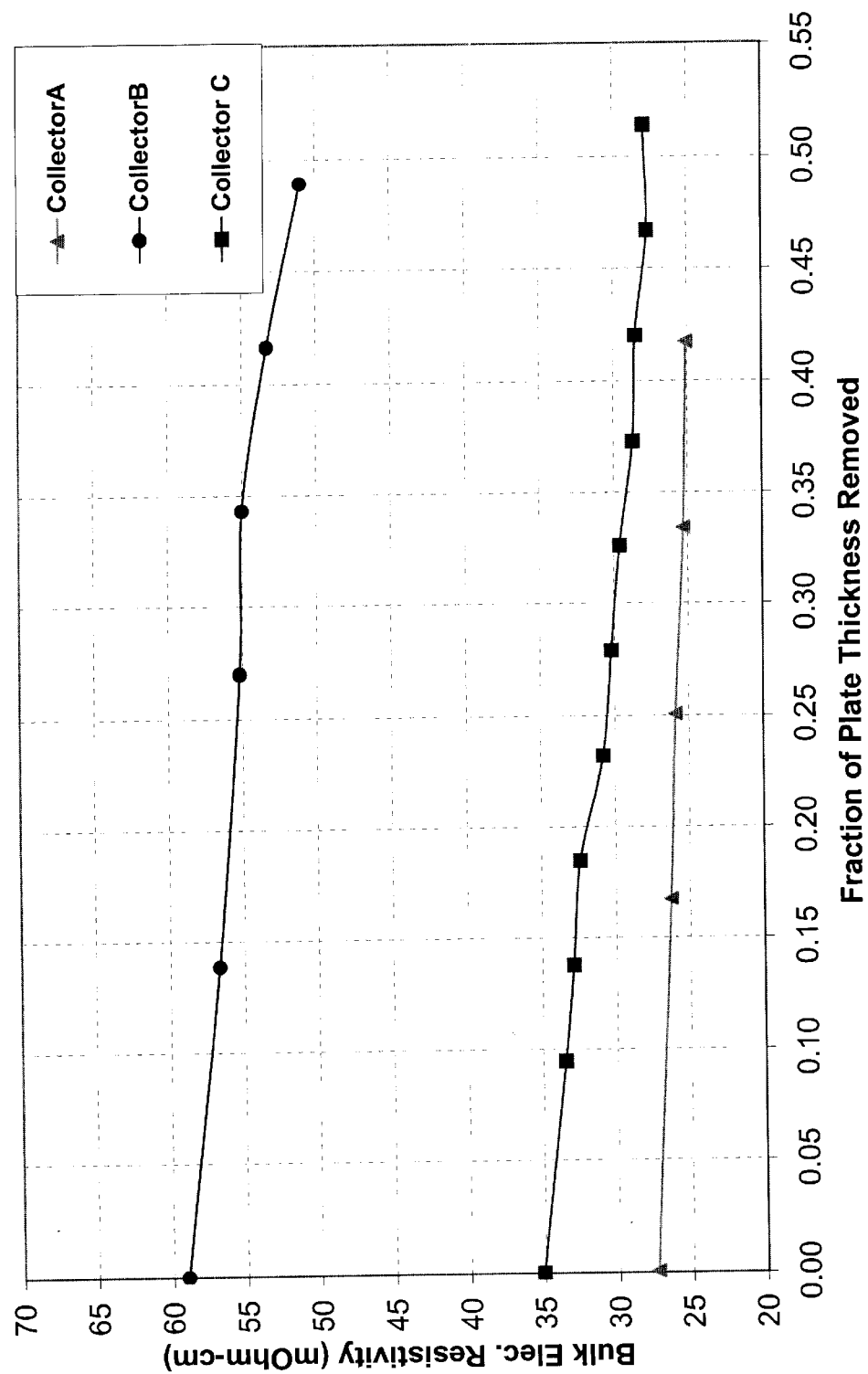
FIG. 7 is a plot of fraction of plate thickness removed by surfacing vs. average of bulk electrical resistivity in transverse and flow directions during injection molding.

As shown in FIG. 7, a separate parallel test was performed to measure the bulk resistivity of the collector plates. This measurement is largely insensitive to surface properties. The bulk resistivity was reduced by only a few percent throughout the surface removal range. Consequently, changes in bulk resistivity did not contribute to the observed changes in total sub-cell resistance. Therefore, it was concluded that the resistance was dropping for two reasons. Firstly, the removal of the resistive surface layer enabled better electrical conduction through the sample by exposing more electrical pathways. Secondly, the overall plate thickness was decreasing after each surface removal operation, causing the corresponding resistance to decrease. For homogeneous materials this change would be linear.

In addition to decreasing the electrical resistance of the collector plate, the surface removal process tends to increase the geometrical envelope of the injection molding process. The injection molding and surface removal processes work together synergistically. The injection mold cavity is designed so that the molded plate has higher land projections than required for the finished part. The excess height is determined, in part, based on the electrical resistance curve that is used to find the resistive layer thickness. The value of excess land height (to be removed in the secondary process) is at least equivalent to the resistive surface layer thickness.

For larger production volumes, it may be beneficial to recapture the ground excess material with an appropriate powder handling system, and recycle it back into the molding process. Vacuum systems designed to handle bulk powder materials are readily available. If this method is not in place then one should limit the surface removal to avoid material waste. To weigh these options properly, one must consider the machine capabilities and the mold design complexity to see if excess land height (beyond resistive surface layer height) will significantly benefit the molding operation.

Designing for excess height in the land areas of the collector plate serves to increase the size of the injection mold cavity. For example, the cross sectional area of the collector plate is increased. This reduces the pressure drop across the collector plate during the injection process. A larger area plate can be molded using equivalent injection pressure and clamp tonnage when the plate cross sectional area is made larger. Alternatively, very thin collector plates can ultimately be manufactured with less injection pressure and less clamp tonnage by using the injection and surface material removal process.

Since collector plates make up the majority of a fuel cell stack, the ability to mold very thin, large area and highly conductive collector plates greatly increases the stack power density, and tends to reduce the number of plates needed per fuel cell kilowatt. Therefore, the value of a collector plate is largely dependent on its aspect ratio and performance.

In addition to enhancing the ability to injection mold thin large area plates, the molding and surface removal process enhances functionality of these plates within the fuel cell. The improved conductivity and functionality are the main benefits of the novel collector plate structure. When using very thin plates, the polymer rich layers forming the channel walls prevent gas crossover or permeation between cells. This results from the higher level of polymer that effectively seals all pores within the plate. Since these layers are an integral part of the plate, the barrier will not deteriorate or wash away. This enables the fuel cell to run safely and at a higher level of efficiency for an extended period of time.

The polymer rich layers on the channel walls also provide high mechanical strength by eliminating the pores that lead to crack propagation, and by forming aligned reinforcing layers beneath the surface. The web between the channel floors of the collector plate is typically the thinnest section of the plate and represents the weakest part of a traditional collector plate. With polymer rich channel surfaces, very thin plates can be used without damage occurring during handling, assembly or operation in the fuel cell.

These layers also provide excellent erosion and chemical resistance to enable design for fifty to one hundred thousand operational hours under very aggressive conditions. The channel walls of the collector plate are smooth and non-porous. They retain the surface finish of the injection mold projections (cores), resulting in hydrophobicity, and acting as a water repellent to enhance water transport and removal during fuel cell operation.

Providing for enhanced conductive properties through the land areas and internal structure of the plate, and providing for enhanced structural and barrier properties in the channel walls optimizes the collector plate structure. Using the surface removal technique enables the injection molding process to fabricate parts that may not be possible in a single step process due to machine and material flow limitations. Yet working as a whole, this invention represents significant innovation for mass production in the field of highly conductive polymer composites, and particularly in the field of PEM fuel cells for electric power generation.

Although preferred embodiments of the method and product of the invention have been described above with relatively great detail and specificity, these embodiments are intended only as examples. Alternatives and variations within the scope of the invention may now be readily apparent to one skilled in the art after a review of this disclosure. As such the proper scope of the invention to which the inventor is entitled should be determined from the following claims and not by the above detailed description.

What is claimed is:

1. A method of fabricating a current collector plate for use in a fuel cell, said method comprising the steps of:
   providing a conductive material-binder composition shaped as a current collector plate having land areas on at least one surface, said composition having a gradient of increasing concentration of binder from a bulk portion of said collector plate toward said land areas; and
   removing a layer of said composition from at least one of said land areas, wherein new land areas having reduced concentrations of binder are provided.

2. The method of claim 1, wherein the step of providing said composition shaped as a current collector plate comprises the steps of:
   injecting the composition into a mold cavity;
   forming the composition into the shape of the current collector plate; and
   removing the current collector plate shaped composition.

3. The method of claim 2, wherein the binder is a thermoplastic.

4. The method of claim 3, wherein the thermoplastic is a liquid crystal polymer.

5. The method of claim 1, wherein the removed layer is between 0.001 and 0.5 cm thick.

6. The method of claim 5, wherein the removed layer is between 0.015 and 0.06 cm thick.

7. The method of claim 1, wherein the step of removing is performed using at least one selected from the group consisting of machining, sanding and surface grinding.

8. The method of claim 1, wherein the land areas prior to layer removal define initial land areas, and land areas exposed after layer removal define post-treatment land areas, and wherein a sub-cell electrical resistance measured when contacting the initial land areas is at least 38% greater than the sub-cell electrical resistance measured when contacting the post-treatment land areas.

9. The method of claim 1, wherein the land areas prior to layer removal define initial land areas, and land areas exposed after layer removal define post-treatment land areas, and wherein a sub-cell electrical resistance measured when contacting the post-treatment land areas is less than 25 mOhm-cm$^2$.

10. The method of claim 1, wherein said removed layer has a thickness, said thickness being 0.09 to 0.50 of a thickness of the collector plate measured at the land areas prior to layer removal.

11. The method of claim 1, wherein said at least one surface provides channels recessed into the plate from said land areas.

12. The method of claim 1, wherein a layer is removed on each of opposing surfaces of said plate.

13. The method of claim 1, wherein the conductive material is carbon.

14. The method of claim 13, wherein the conductive material is graphite.

15. The method of claim 13, wherein the conductive material is a powder.

16. The method of claim 13, wherein the conductive material includes fibers.

17. A fuel cell current collector plate made by the process steps of:
   providing a conductive material-binder composition shaped as a collector plate having opposing planar surfaces spaced by a plate thickness, said composition having a gradient of increasing concentration of binder from a bulk portion of said collector plate toward said planar surfaces; and
   removing a layer of said composition from at least one of said planar surfaces, wherein new planar surfaces having reduced concentrations of binder are provided.

18. A fuel cell current collector plate, comprising:
   conductive material-binder composition shaped as a collector plate having opposing planar surfaces spaced by a plate thickness, said composition having a gradient of increasing concentration of binder from a bulk portion of said collector plate toward said planar surfaces; at least one of said planar surfaces having channels and land areas outside said channels, at least one of said channels having channel base surfaces, said composition having a higher concentration of binder at said channel base surfaces than at said land areas.

19. A fuel cell system, comprising:
   a pair of collector plates having a series of channels for the flow of reactants from ports formed through the collector plates;
   a first and a second gas diffusion layer disposed between said collector plates; and
   a membrane electrode assembly (MEA) including a membrane sandwiched between two electrode layers, said MEA being interposed between said gas diffusion layers;
   each of said collector plates being made of conductive material-binder composition and having opposing planar surfaces spaced by a plate thickness, said composition having a gradient of increasing concentration of binder from a bulk portion of said collector plate toward said planar surfaces; said channels being defined in said planar surfaces, said planar surfaces having land areas outside said channels, said channels having channel base surfaces, said composition having a higher concentration of at said channel base surfaces than at said land areas.

* * * * *